UNITED STATES PATENT OFFICE.

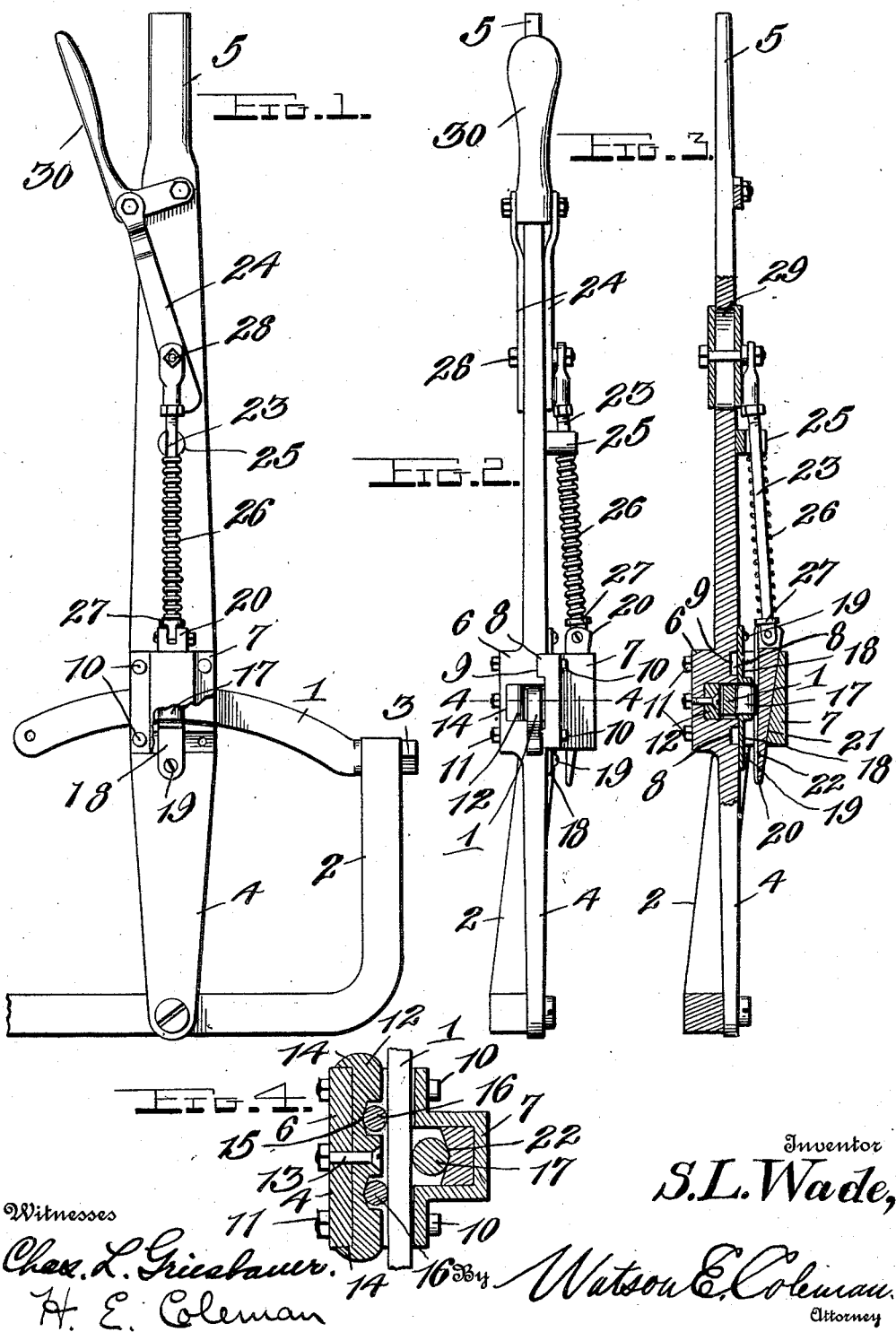

SAMUEL L. WADE, OF WHISTLER, ALABAMA.

HAND-LEVER.

1,006,028.　　　　Specification of Letters Patent.　　Patented Oct. 17, 1911.

Application filed January 23, 1911.　Serial No. 604,227.

*To all whom it may concern:*

Be it known that I, SAMUEL L. WADE, a citizen of the United States, residing at Whistler, in the county of Mobile and State of Alabama, have invented certain new and useful Improvements in Hand-Levers, of which the following is a specification, reference being had to the accompanying drawings.

This invention relates to lever latches, and applies the automatic friction principle to serve the purpose of latching a lever at any desired position. The usual method of latching a lever is by the use of pawls coacting with the teeth of a ratchet.

My invention is particularly adapted for the regulation of reverse and throttle-levers where slight variations of the position of the lever and exactness are required or desired and where safety and practicability require that the lever shall remain where set until purposely re-set.

Where a pawl and ratchet are used as a lever latch, there is no possibility of setting the lever to a greater degree of fineness than the full length of a tooth on the ratchet, which often requires the throwing of the lever too far and if set back again the length of a tooth, it is not far enough, thereby necessitating the continual adjusting and re-adjusting of the lever and at the same time failing to get a uniform adjustment of the amount of steam or power required or desired or a uniform motion of the machinery. Furthermore pawls are apt to be disengaged from the teeth of the ratchet by the motion and jarring of the machinery.

By the use of my clutch device I am able to set the lever at any desired location, thereby being enabled to adjust the amount of steam or power to be admitted for the moving mechanism, which makes it an easy matter to secure a steady motion and uniform moving of the parts of the machinery and also saves the possibility of the lever being moved from its setting by the jarring motions of the machinery.

The object of the invention is to provide a device of this character whereby the lever may be readily clutched into engagement with the quadrant bar at any desired position.

Another object is to provide a device of this character that will possess advantages in points of efficiency, durability, is inexpensive and at the same time being simple in construction and operation.

With the above and other objects in view, the invention consists in the novel features of construction and arrangement of parts hereinafter described, pointed out in the claims, and shown in the accompanying drawings, in which—

Figure 1 is a side elevation, partially broken away, of a lever latch constructed in accordance with my invention; Fig. 2 is an edge view of the same; Fig. 3 is a vertical sectional view through the lever; and Fig. 4 is a detail sectional view taken on the line 4—4 of Fig. 2.

Referring more particularly to the drawings 1 indicates the quadrant bar which is provided with perfectly smooth segmental gripping surfaces. The end of the bar is secured to one end of the supporting frame 2 by means of the nut 3 threaded on the outer end of the bar which is passed through an opening in the end of the frame 2.

Pivotally mounted on the lower side of the frame 2 is a lever 4, having a handle 5 formed at its upper end. Secured to the lever 4 and preferably forming a part of the same is a housing 6 through which the quadrant bar 1 is adapted to work. The housing is provided with a removable U-shaped section 7, each end of the section being provided with the lugs 8 adapted to fit into the longitudinal grooves 9 formed in the lever 4. The section 7 is secured to the lever by means of the bolts 10 passing through the lugs 8 and through the lever 4, and the nuts 11 threaded on the outer ends of the bolts. Arranged in the bottom of the housing 6 is a bearing plate 12 rigidly secured therein by means of the bolt 13. A lip 14 is formed on each end of the plate 12 to engage the sides of the housing to prevent any movement whatever of the plate. The plate is also provided with the tapering grooves 15 adapted to receive the friction rollers 16 which engage one side of the quadrant bar 1. A friction roller 17 is held in engagement with the other side of the bar 1 by means of the U-shaped section 7 and the guide plates 18, the guide plates 18 having one end bent up at right angles to engage each end of the roller 17, the other end of the plate being secured to the lever 4 by means of the screws 19.

Slidably mounted in the section 7 is a tapering key 20 having a smooth surface on one side to slide against the tapering portion 21 of the section 7, the other side of the key being provided with a tapering groove 22 adapted to receive the roller 17.

Pivotally secured to the large end of the key is an operating rod 23, having its upper end pivotally connected to the connecting bars 24, and operating in a slotted pin 25 secured to the lever 4. A coil spring 26 is mounted on the rod 23 to hold the key 20 in its normal position, the spring 26 having one end bearing on the circular portion 27 formed integral with the rod 23, and its other end bearing on the pin 25. The connecting bars 24 are secured together at their lower ends by means of the bolt 28, the bars 24 being slidably mounted on the lever 4 by means of the slot 29 in which the bolt 28 operates, and having their upper ends connected to the operating handle 30 which is pivotally mounted to the upper end of the lever 4. The spring 26 will tend to hold the tapering key 20 securely within the removable section 7 of the housing so that the roller 17 will be held in engagement with the sides of the tapered groove 22 and tend to bind against the bar 1 so that both the bar 1 and roller 17 will be held in a rigid position. It will be obvious that by pressing upon the operating handle 30 it will disengage the tapered key 20 from the roller 17 which will release the lever 4 from the bar 1 and allow it to be moved to any desired position. The roller 17 which is disposed in the groove 22 in the key 20, and the rollers 16 in the grooves 15 of the plate 12 will tend to bind against the bar 1 when the key 20 is in a normal position, so that the lever 4 is held in a rigid position upon the bar 1.

While I have shown and described the preferred construction of my invention I do not wish to limit myself thereto but desire to make such changes as fairly fall within the scope thereof.

It will be obvious that various changes in the details of construction and in the proportions may be resorted to for successfully carrying the invention into practice without sacrificing any of the advantages or departing from the scope thereof.

Having thus described the invention what is claimed is:

1. In a device of the character described, the combination of a fixed segment bar, a lever having a housing through which the bar is adapted to work, friction rollers carried by said housing to engage the bar, said housing having a removable section rigidly secured to the lever, a tapering key slidably mounted in said removable section and adapted to engage one of said rollers, and means mounted on the lever to operate said key and cause the latter, by co-action with the outer side of the removable section and one of said rollers, to frictionally engage the rollers with opposite sides of the bar and lock and unlock the lever relatively to said bar.

2. In a device of the character described, the combination of a segment bar, a lever having a housing through which the bar is adapted to work, a bearing plate secured in said housing having tapering grooves formed therein, friction rollers disposed in said grooves and engaging said bar, said housing having a removable section rigidly secured to the lever, a friction roller mounted in said section and engaging the bar, a tapering key slidably mounted in said removable section and engaging said roller, and means mounted on the lever to operate said key to cause the latter, by co-action with the outer side of the removable section and the last mentioned roller, to frictionally engage the rollers with the opposite sides of the bar and lock and unlock the lever relatively to said bar.

3. In a device of the character described, the combination of a fixed segment bar, a lever having a housing through which the bar is adapted to work, friction rollers carried by said housing, said housing having a removable section rigidly secured to the lever, a friction roller mounted in said removable section and engaging the bar, a tapering key slidably mounted in said section and having a groove to engage the last mentioned roller, and means mounted on the lever to operate said key to cause the latter by co-action with the outer side of the removable section and the last mentioned roller to frictionally engage the rollers with opposite sides of the bar.

4. In a device of the character described, the combination of a fixed segment bar, a lever having a housing through which the bar operates, friction rollers carried by said housing, a tapering key slidably mounted in said housing having a tapering groove to engage one of said friction rollers, and means mounted on the lever to operate said key and cause the latter by co-action with the outer side of the housing and the last mentioned roller to frictionally engage the rollers with opposite sides of the bar and lock and unlock the lever relatively to said bar.

5. In a device of the character described, the combination of a fixed segment bar, a lever having a housing through which the bar operates, a bearing plate secured in said housing carrying friction rollers, said housing having a U-shaped removable section, lugs formed on said section adapted to be disposed in transverse grooves formed in the lever, a friction roller mounted in said section engaging said bar, guide plates secured to the lever adjacent the roller, a tapering key slidably mounted in said removable section and engaging said last named friction roller, and means mounted on the lever to operate said key and cause the latter, by co-action with the outer side of the removable section and the last mentioned roller, to frictionally engage the rollers with the opposite sides of the bar and lock and unlock the lever relatively to said bar.

In testimony whereof I hereunto affix my signature in the presence of two witnesses.

SAMUEL L. WADE.

Witnesses:
M. D. THERRELL,
P. J. GROSSKOPF.

Copies of this patent may be obtained for five cents each, by addressing the "Commissioner of Patents, Washington, D. C."